United States Patent [19]  [11] 4,018,687
Zahour  [45] Apr. 19, 1977

[54] GLASS-ENCLOSED INTEGRAL GLASS AND CERAMIC FILTER UNIT

[75] Inventor: Robert Theodore Zahour, Easton, Pa.

[73] Assignee: J. T. Baker Chemical Company, Phillipsburg, N.J.

[22] Filed: July 26, 1976

[21] Appl. No.: 708,327

[52] U.S. Cl. .............................. 210/448; 55/498; 55/514; 55/523; 210/446
[51] Int. Cl.² ........................................ B01D 27/00
[58] Field of Search ................ 55/498, 514, 523; 210/441, 446, 455, 448, 483, 496, 497 R, 500 R

[56] References Cited
UNITED STATES PATENTS

| | | | |
|---|---|---|---|
| 568,787 | 10/1896 | Aster, Jr. ............................ | 210/448 |
| 2,376,739 | 5/1945 | Walker, Jr. ..................... | 210/448 X |
| 2,932,398 | 4/1960 | Korte ............................. | 210/448 X |
| 3,393,843 | 7/1968 | Mumby .............................. | 210/457 |

Primary Examiner—Frank A. Spear, Jr.
Assistant Examiner—Richard W. Burks
Attorney, Agent, or Firm—George W. Rauchfuss, Jr.; Eugene O. Retter

[57] ABSTRACT

A glass-enclosed integral glass and ceramic filter unit is described for filtering sulfuric acid or other liquid solutions which do not attack silica and in which the sole communication between a first and a second chamber within a totally enclosing glass housing is through the pores of a ceramic filter membrane. This microporous ceramic membrane is connected to the interior of the glass housing by a glass seal wall member fusion bonded thereto advantageously providing an integral filter unit without any mechanical pressure seals or gaskets or other sealing elements having joints through which finely divided particulate matter could by-pass the filter membrane. To accommodate the significant difference between the coefficient of thermal expansion of the ceramic filter membrane, which is described as microporous porcelain, and that of the glass housing, the glass sealing wall member is formed of a plurality of bands of glass having different coefficients of thermal expansion which are graded in sequence for providing a progressive transition while achieving an integral structure.

14 Claims, 4 Drawing Figures

GLASS-ENCLOSED INTEGRAL GLASS AND CERAMIC FILTER UNIT

DESCRIPTION

The present invention provides a glass-enclosed integral glass and ceramic filter unit which may be advantageously used to purify chemical solutions, for example such as sulfuric acid, by removing finely divided particulate matter therefrom.

BACKGROUND OF THE INVENTION

In the prior art chemical solutions such as sulfuric acid are purified by passage under pressure through porous ceramic filters. The apparatus used in the prior art includes gaskets, line seals, or other mechanical pressure seals having joints communicating with the flow path. Inevitably finely divided particulate matter which is often organic in nature works its way around the gaskets or through the mechanical joints being driven by the pressure of the flow used in the filtering step. Thus, these fine particles find their way into the filtered sulfuric acid. These organic particles which have by-passed the filter then become oxidized by the sulfuric acid becoming carbonaceous and they show as black specks and particles in the filtered solution. This by-passing of particulate matter past the filter media has been a continuing problem in the production of purified sulfuric acid and other solutions.

SUMMARY OF THE INVENTION

The present invention provides a glass-enclosed glass and ceramic filter unit which is an integral structure without any mechanical pressure seals or gaskets or other sealing elements having joints through which finely divided particulate matter can by-pass the filter media. The sole communication between a first and a second chamber within a totally enclosing glass housing is directly through the micropores of a ceramic filter membrane. This microporous ceramic membrane is integrally connected to the interior of the glass housing by a glass seal wall member which has been fused onto the border of the ceramic membrane and which has also been fused onto the interior of the glass housing.

To accommodate the significant difference between the coefficient of thermal expansion of the ceramic filter membrane, which is described as microporous porcelain, and that of the glass housing, the glass sealing wall member is formed of a plurality of bands of glass having different coefficients of thermal expansion which are graded in sequence for providing a progressive transition while achieving an integral structure.

It is among the advantages of a filter unit embodying this invention that it can be used with assurance that the filtered solution will actually be purified and free of particulate matter down to the size of the micropores in the filter. Thus, the sulfuric acid or other chemical solution being produced can be introduced directly into a container, such as a carboy, in which the product will be shipped.

The integral filter unit can be re-used many times by back-flushing it with suitable liquid, such as distilled water, to remove the particulate matter which has accumulated on the upstream side of the microporous ceramic filter membrane. The ports of the glass housing are shaped for convenient fastening into a glass pipeline.

The various features, aspects and advantages of the filter unit embodying the present invention will be more fully understood from a consideration of the detailed description set forth further below in conjunction with the accompanying drawings.

DETAILED DESCRIPTION

Figure 1:
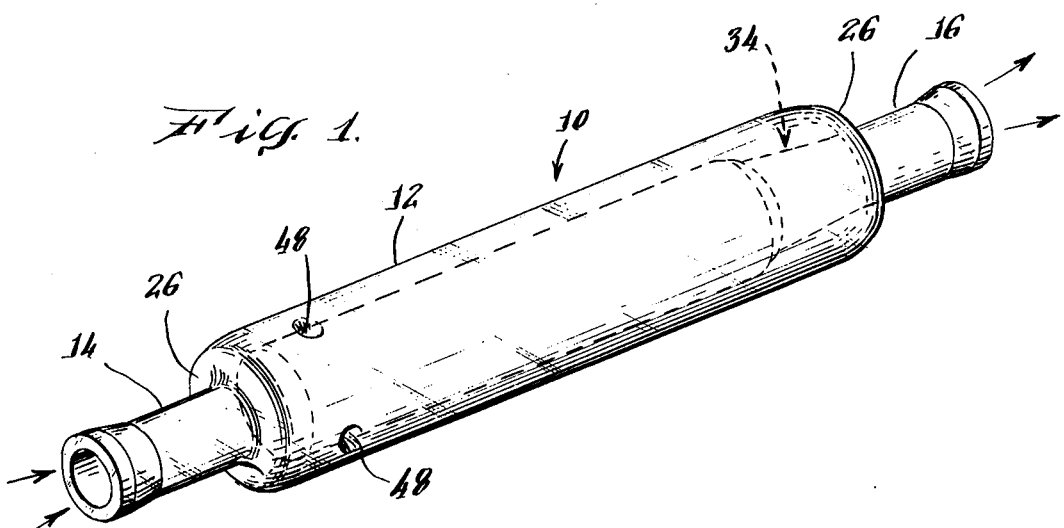
FIG. 1 is a perspective view of the totally glass-enclosed integral glass and ceramic filter unit as seen looking at the input end.
Figure 2:
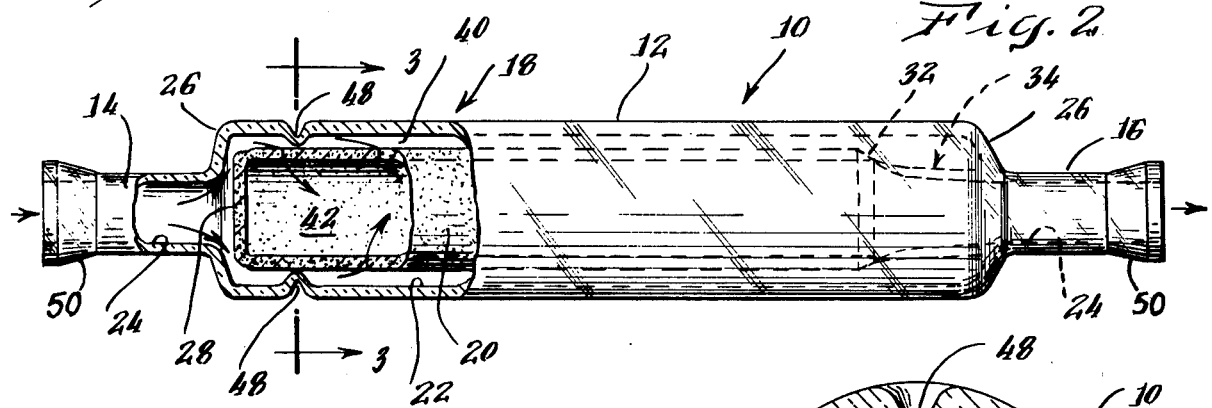
FIG. 2 is a side elevational view of the filter unit with a portion of the input end and of the glass housing and filter membrane shown broken away in section for revealing the internal structural arrangement.

As shown in FIG. 1, a filter unit 10 embodying the present invention includes a tubular glass envelope 12 having first and second glass ports 14 and 16 secured to opposite ends of the envelope 12 and axially aligned with it. This envelope 12, together with its glass ports 14 and 16, forms an integral glass housing 18, as shown in FIG. 2, for totally enclosing a microporous ceramic filter membrane 20. In this presently preferred embodiment, the membrane 20 has a tubular configuration and extends longitudinally within the tubular envelope 12. The bore 22 of the envelope 12 is considerably larger in cross-sectional area than bores 24 of the glass ports 14 and 16 being joined thereto by rounded sloping end shoulders 26 of the envelope 12. A specific example of a filter unit is described near the end of this specification.

The tubular ceramic filter membrane 20 has one end closed off by an end wall 28 which faces toward the bore 24 of the first port 14. The other end of this tubular filter has an open mouth 30, as seen most clearly in FIG. 4, being defined by an encircling lip 32 of the membrane. This open mouth 30 faces toward the bore 24 of the second port 16.

Figure 4:
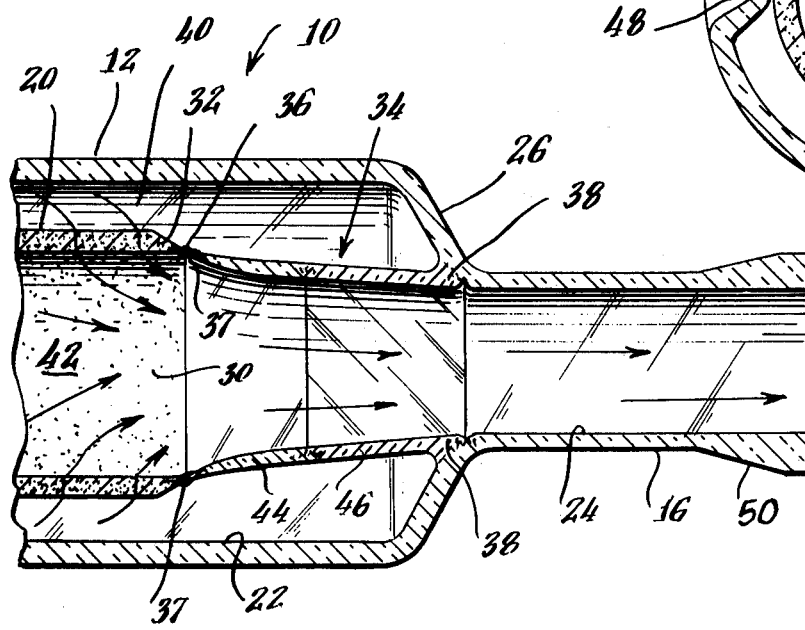
FIG. 4 is an enlarged elevational sectional view of the outlet end portions of the filter unit for showing a glass seal wall member which is fused to the ceramic filter membrane and also to the interior of the glass housing and which is formed of graded glass for providing a transition between the coefficient of thermal expansion of the filter membrane and that of the glass housing.

In order to separate the region within the housing 18 into two completely separate filter chambers, there is a tubular glass wall member 34 (as seen most clearly in FIG. 4). This wall member 34 forms an integral seal extending between the extreme border 36 of the filter membrane and the interior of the glass housing 18. One border of this wall member 34 is fused at 37 to the border 36 of the membrane. The other border of the wall member 34 is fusion bonded at 38 to the interior of the glass housing 18 near the juncture between the sloping end shoulder 26 and the tubular port 16.

In this illustrative embodiment, the flow path for the sulfuric acid or other solution to be purified by filtration enters the bore 24 of the first port 14 and passes as shown in FIG. 2 into the first filter chamber 40. The liquid passes through the micropores of the membrane 20 and into the second chamber 42 while leaving particulate material on the outer surface of the membrane 20. The flow path continues as shown in FIG. 4 through the tubular glass seal member 34 and out through the bore 24 of the second port 16.

Because the micropores in the membrane wall 20 are quite small, the liquid to be filtered is driven through the filter unit with a significant pressure differential between the chambers 40 and 42. For example, this pressure differential may be of the order of one to three atmospheres.

Thus, the first chamber 40 surrounding the filter 20 is completely separated from the second chamber 42 located within this filter. The sole communication between these two filter chambers 40 and 42 which lie on opposite sides of the filter membrane is directly through the membrane itself. There is absolutely no opportunity for any particulate matter to by-pass this filter membrane by virtue of the fact that the filter unit is an integral structure with no mechanical pressure seals or gaskets or other sealing elements which would introduce joints communicating with the flow path.

If desired, after usage, the filter unit 10 can be back-flushed by suitable liquid, such as distilled water, for removing any particulate matter which has accumulated on the outer surface of the membrane 20. Thus, the filter unit 10 can be re-used many times when handled with reasonable care. When filtering sulfuric acid, for example, the outlet port 16 can be introduced directly into the entrance of the container, such as a carboy, in which the purified solution is to be shipped.

The ceramic filter membrane 20 has a coefficient of thermal expansion which is significantly different from the coefficient of thermal expansion of the glass housing 18. To provide a transition for reducing the stresses caused by the differing thermal expansion rates, the glass seal wall member 34 is formed by a plurality of generally annular bands 44 and 46 of glass. These bands 44 and 46 have differing coefficients of thermal expansion which are graded in sequence to provide a progressive transition between the coefficients of thermal expansion of the ceramic filter and the glass housing.

As seen in FIG. 4, the lip 32 is tapered down to a thin edge border 36 for facilitating fusion bonded connection at 37 of the adjacent border of the glass band 44 to the tapered edge of the ceramic membrane.

Figure 3:
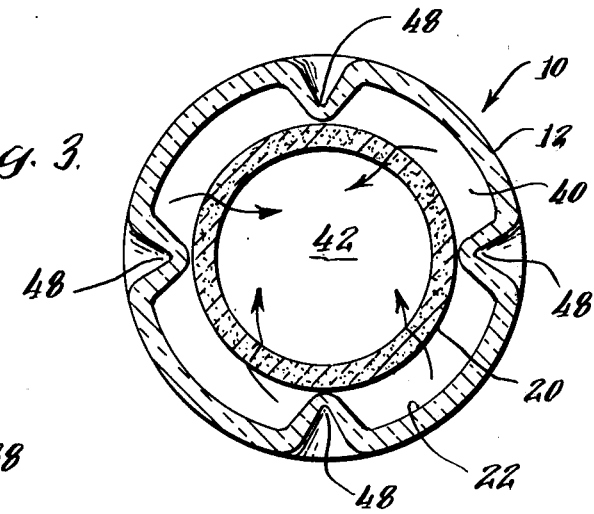
FIG. 3 is an enlarged cross-sectional view taken through the plane 3—3 in FIG. 2.

In order to provide mechanical support for the opposite end of the tubular filter 20 from the location of the glass seal wall member 34, there are at least three indentations 48 formed into the glass envelope 12 providing internal protrusions positioned closely adjacent to areas of the ceramic membrane near the closed end 28. These mechanical supports are shown in FIG. 3 as being equally spaced about the axis of a ceramic filter which in this embodiment is of circular cylindrical configuration concentric within a circular cylindrical envelope 12.

In a specific example, the tubular ceramic filter membrane 20 is a micro-porous porcelain filter having a nominal porosity of 12 microns, with an absolute retention of 25 microns. Such a tubular porcelain filter can be obtained commercially from the Selas Corporation of America, located in Spring House, Pennsylvania 19477. The Selas catalogue number for such a filter is FO-1610, except that the lip 32 (FIG. 4) is preferably tapered down to a thin edge portion 36, as described above. The tubular filter 20 has a length of 10 inches, an internal diameter (I.D.) of 1½ inches and an outside diameter (O.D.) of 2 inches, with a membrane wall thickness of approximately ¼th of an inch. The envelope 12 has an I.D. (i.e. bore 22) of 2⅜ inches and an O.D. of 2¾ inches with a wall thickness of approximately 3/16ths of an inch. The envelope 12 is approximately 12¼ inches long, and the overall length of the housing 18 including the ports 14 and 16 is approximately 17¼ inches. The bores 24 of the ports 14 and 16 have an I.D. of 1 inch. For convenience in connecting the filter unit 10 into a glass pipeline, the ports 14 and 16 are each shown as having at their outer ends an outwardly flaring conical surface 50.

The microporous porcelain membrane 20 has a coefficient of thermal expansion of $4.7 \times 10^{-6}$ per degree Centigrade, while the glass housing 18 may advantageously be made of 7740 borosilicate glass, which is obtainable commercially under the trademark PYREX, having a coefficient of thermal expansion of $3.2 \times 10^{-6}$ per degree Centigrade. The band 44 is of 7052 borosilicate glass having a coefficient of $4.6 \times 10^{-6}$ per degree Centigrade which is slightly less than but approximately equal to that of the ceramic membrane. Therefore, very little stress is imposed upon the thin tapering border 36 of the ceramic membrane by virtue of the near equality of these coefficients. The band 46 is of 3320 borosilicate having a coefficient of $4.0 \times 10^{-6}$ per degree Centigrade which is approximately mid-way between that of the glass housing and that of the first band 44.

It is to be understood that similar tubular porcelain filter membranes 20 having other sizes of micropores can be utilized in the filter unit 10.

The filter unit 10 can be used for filtering sulfuric acid and other liquid solutions which do not attack silica, for example such as nitric acid, hydrochloric acid and solutions of zinc sulfate, potassium cyanide, calcium hydroxide, sodium chloride, ammonium chloride, and ammonium hydroxide.

While the novel features of the invention have been illustrated and described in connection with a specific embodiment, it is believed that this detailed disclosure will enable others skilled in the art to apply the principles of the invention in forms departing from the exemplary embodiment shown herein, and such departures are contemplated by the following claims.

I claim:

1. A totally glass-enclosed integral glass and ceramic filter unit for removal of particulate matter from sulfuric acid and from other liquid solutions which do not attack silica comprising:

a glass envelope having first and second glass ports integral therewith, said first and second ports each providing communication from the exterior of said envelope with the interior region therein, said envelope together with its ports forming an integral glass housing enclosing said region, a microporous ceramic filter membrane positioned within said region, said filter membrane having a border extending therearound, a glass seal wall member having first and second borders, a first border of said wall member being fused to the border of said filter membrane, the second border of said wall member being fused to the interior of said housing for causing said glass wall member together with said filter membrane to separate said interior region into first and second chambers with said filter membrane being positioned between said first and second chambers and with the sole communication between said chambers being through said filter membrane, said first glass port communicating with said first chamber and said second glass port communicating with said second chamber, and said glass seal wall member including glass material having a coefficient of thermal expansion intermediate the coefficients of thermal expansion of said ceramic filter membrane and of said glass housing for forming a transition therebetween.

2. A totally glass-enclosed integral glass and ceramic filter unit as claimed in claim 1, in which:

said glass seal wall member includes a plurality of glass materials having different coefficients of thermal expansion, the respective coefficients being graded for forming a progressive transition from said ceramic filter membrane to said glass housing.

3. A totally glass-enclosed integral glass and ceramic filter unit as claimed in claim 1, in which:

said glass seal wall member includes a plurality of bands of glass of differing coefficients of thermal expansion, a first of said bands extending along said first border of said glass wall member and a second of said bands extending along said second border of said wall member, said first glass band having a coefficient of thermal expansion intermediate that of said ceramic filter membrane and that of said second band, and said second glass band having a coefficient of thermal expansion intermediate that of said first band and that of said glass housing.

4. A totally glass-enclosed integral glass and ceramic filter unit as claimed in claim 1, in which:

said border of said ceramic filter membrane is formed by tapering down the edge of the membrane for providing a relatively thin edge portion of said membrane to which said glass seal wall member is fused, said relatively thin edge portion of said membrane being thinner than the remainder thereof.

5. A totally glass-enclosed integral glass and ceramic filter unit as claimed in claim 1, in which:

said glass housing has a plurality of indentations therein providing interior protrusions for mechanically supporting areas of said ceramic membrane which are remotely located from the border of said membrane.

6. A totally glass-enclosed integral glass and ceramic filter unit as claimed in claim 1, in which:

said first and second glass ports are tubular and extend outwardly from said envelope, and the outer ends of said tubular ports have outwardly flaring conical surfaces.

7. A totally glass-enclosed integral glass and ceramic filter unit as claimed in claim 1, in which:

said microporous ceramic filter membrane is porcelain.

8. A totally glass-enclosed integral glass and ceramic filter unit for removal of particulate matter from sulfuric acid and from other liquid solutions which do not attack silica comprising:

a tubular glass envelope having first and second tubular ports integral therewith and extending from opposite ends of said tubular envelope, said envelope together with its ports forming an integral glass housing with the bore of said envelope being larger in cross-sectional area than the bores of said ports, a tubular microporous ceramic filter membrane extending longitudinally within said envelope and having one closed end facing toward the bore of said first port and having an open mouth at its opposite end encircled by a lip of said membrane, a tubular glass seal member having one border fused to said lip of said membrane and having the outer border fused to the interior of said glass housing for separating the bore of said envelope into a first chamber outside of said tubular ceramic membrane and a second chamber within said tubular ceramic membrane with the sole communication between said chambers being through the pores of said membrane, said first port communicating with said first chamber and said second port communicating with said second chamber, and said tubular glass seal member having a coefficient of thermal expansion intermediate that of said ceramic membrane and that of said glass housing.

9. A totally glass-enclosed integral glass and ceramic filter unit as claimed in claim 8, in which said tubular glass seal member has its other border fused to the interior of said glass housing near the juncture of said second port and one end of said glass envelope.

10. A totally glass-enclosed integral glass and ceramic filter unit as claimed in claim 8, in which said tubular glass seal member includes a sequence of bands of glass of differing coefficients of thermal expansion forming a progressive transition between the coefficient of thermal expansion of said ceramic filter membrane and that of said glass housing.

11. A totally glass-enclosed integral glass and ceramic filter as claimed in claim 10, in which:

the band of glass adjacent to the border of the ceramic membrane has a coefficient of thermal expansion approximately equal to that of the membrane.

12. A totally glass-enclosed integral glass and ceramic filter as claimed in claim 8, in which:

said tubular glass seal member includes a first band of glass extending adjacent to the fusion connection with said ceramic membrane and has a second band of glass extending adjacent to the fusion connection with the interior of the glass housing, the coefficient of thermal expansion of said first band being intermediate that of said ceramic membrane and that of said second band, and the coefficient of thermal expansion of said second band being intermediate that of said first band and that of said glass housing.

13. A totally glass-enclosed integral glass and ceramic filter unit as claimed in claim 8, in which:

said lip of said membrane tapers down to a thinner edge portion to which is fused the border of said tubular glass seal member.

14. A totally glass-enclosed integral glass and ceramic filter unit as claimed in claim 8, in which:

said tubular glass envelope has at least three interior protrusions located near the closed end of said tubular ceramic filter membrane and spaced about said filter membrane for providing mechanical support to the opposite end thereof from the end to which is fused said tubular glass seal member.

* * * * *